United States Patent [19]

de Launay

[11] 4,176,680

[45] Dec. 4, 1979

[54] CHECK VALVE

[76] Inventor: Paul de Launay, 119 W. Farrel, Lafayette, La. 70508

[21] Appl. No.: 838,148

[22] Filed: Sep. 30, 1977

[51] Int. Cl.² ............................................. F16K 15/02
[52] U.S. Cl. ................................ 137/496; 137/516.29; 137/538
[58] Field of Search ........... 137/469, 494, 496, 516.25, 137/516.27, 516.29, 538

[56] References Cited

U.S. PATENT DOCUMENTS

| 2,206,356 | 7/1940 | Hutchings . | |
|---|---|---|---|
| 2,633,147 | 3/1953 | Badami . | |
| 2,655,173 | 10/1953 | Overbeke | 137/494 X |
| 2,745,432 | 5/1956 | Williams . | |
| 3,234,959 | 2/1966 | Feinberg | 137/538 X |
| 3,344,806 | 10/1967 | Schultz | 137/494 |
| 3,384,111 | 5/1968 | Webb | 137/496 |
| 3,943,969 | 4/1975 | Rubin . | |

FOREIGN PATENT DOCUMENTS 756162  8/1956  United Kingdom ..................... 137/538

Primary Examiner—Robert G. Nilson
Attorney, Agent, or Firm—Guy E. Matthews

[57] ABSTRACT

A check valve used in a fluid flow line is disclosed and includes a body having a first portion defining an inlet passageway, an outlet passageway and a shoulder which directs fluid flow upwardly through an opening into the outlet passageway and a second portion with a tubular section threadably engaged in the opening which receives the flowing fluid in one end for flowing up the tubular section and out outlet ports. A flange extends outwardly from the tubular portion at a location below the outlet ports to define an upwardly facing sealing surface. A plunger member is mounted within the body and includes a plug slideably mounted within the longitudinal passage and a tubular sleeve mounted to circumscribe the tubular section with the sleeve having a shoulder forming a downwardly facing sealing surface which is engageable with the upwardly facing sealing surface on the flange, the sleeve being moved upwardly by the pressure exerted by the fluid on the plug. A spring is mounted with the plunger member to urge the downwardly facing sealing surface into engagement with the upwardly facing sealing surface to thereby prevent fluid communication between the inlet and outlet passageways by stopping fluid flow into the outlet ports when the pressure of the fluid within the inlet passageway is insufficient to overcome the force provided by the spring.

5 Claims, 3 Drawing Figures

CHECK VALVE

BACKGROUND AND SUMMARY

As is well known, a check valve is used to permit the flow of fluid traveling in a flow line in one direction while stopping flow in the opposite direction. Commonly, the prior art check valves permit the direct passage of the flowing fluid over a sealing surface located on the valve body. Thus, the sealing surface becomes eroded by the fluid action and expensive procedures, such as removal of the valve from the flow line and machining the sealing surface to repair the valve or replacing the valve in the flow line, are necessary to insure the stoppage of fluid flow from the opposite direction.

Accordingly, it is an object of the present invention to provide a check valve which permits the flow of a fluid through a flow line in one direction while stopping fluid flow in the opposite direction.

Further, it is an object of the present invention to provide a check valve which requires less maintenance than the prior art check valves and is thereby more dependable and less expense for use in flow lines.

Further, it is an object of the present invention to provide a check valve which permits fluid flow in a flow line in one direction while stopping flow in the opposite direction and inhibits the erosive forces acting on the sealing surfaces.

In accordance with the invention, a check valve is used in a fluid flow line and includes a valve body having a first portion with an inlet end for directing the flow of fluid from the flow line through an inlet passageway, an outlet end for directing the flow of fluid received from the inlet passageway through an outlet passageway into the fluid flow line, and a flow channeling shoulder mounted at a junction between the inlet and outlet passageways for directing fluid flow upwardly from the inlet passageway through an opening into the outlet passageway, and a second portion with a tubular section defining a longitudinal passageway with outlet ports extending transversely therefrom, the tubular section being mounted in the opening of the first portion to receive the flowing fluid from the inlet passageway in one end of the longitudinal passageway for fluid flow up the tubular section and out the outlet ports into the outlet passageway. A flange extends outwardly from the tubular portion at a location below the outlet ports to define an upwardly facing sealing surface with the upwardly facing sealing surface being disposed sufficiently below the outlet ports to inhibit erosion thereof by flowing fluid. A plunger member is mounted within the body and includes a plug mounted on a lower portion of the plunger member for sliding within the longitudinal passageway of the second portion of the body and a tubular sleeve is mounted with the plunger member and circumscribes the tubular section. The sleeve has a shoulder which forms a downwardly facing sealing surface, the surface being engageable with the upwardly facing sealing surface on the flange. The sleeve is moved upwardly fluid pressure exerted on the plug against a force provided by a spring mounted with the plunger member for urging the downwardly facing sealing surface into engagement with the upwardly facing sealing surface which thereby prevents fluid communication between the inlet and outlet passageways by stopping fluid flow into the outlet ports when the pressure of the fluid within the inlet passageway is insufficient to overcome the force provided by the spring.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
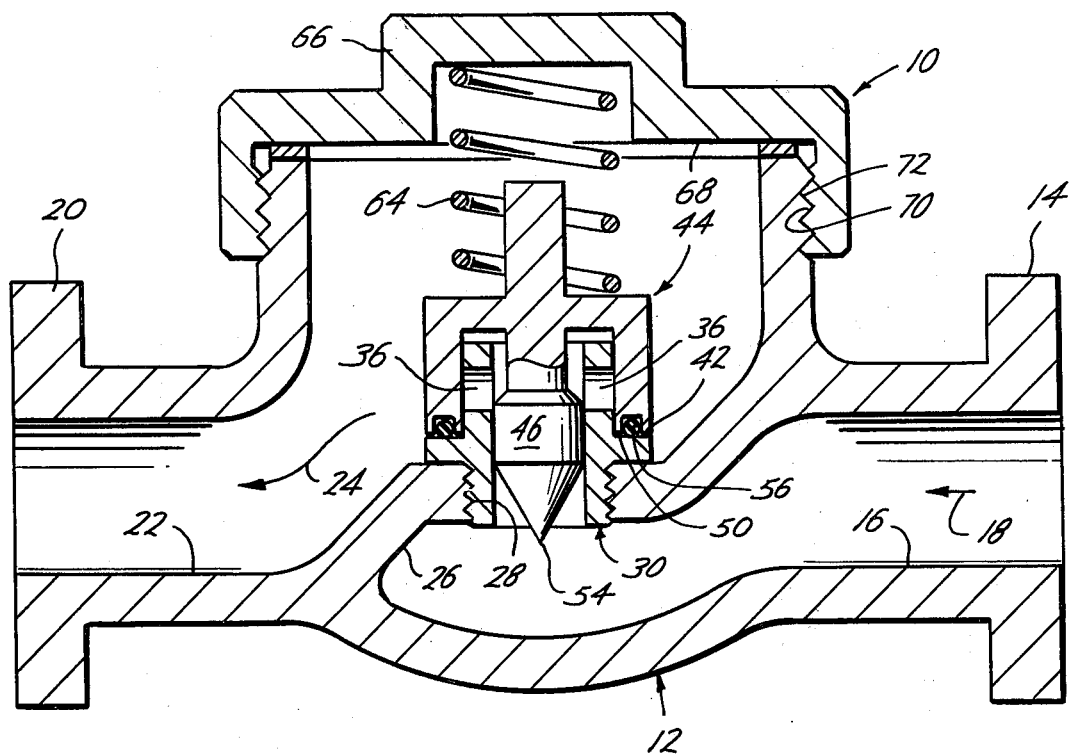
FIG. 1 is an elevational view, partly in section, of an embodiment of a check valve constructed according to the present invention.

Turning first to FIG. 1, a check valve 10, constructed according to the present invention, is generally illustrated. Valve 10 is used in a fluid flow line (not shown) and includes a valve body 11 with a first portion 12 having an inlet end 14 that directs the flow of fluid from the fluid flow line through an inlet passageway 16, as generally shown by arrow 18. First portion 12 also has an outlet end 20 for directing the flow of fluid received from the inlet passageway 16 through an outlet passageway 22 into the fluid flow line, as generally shown by the arrow 24. A flow channeling shoulder 26 is mounted within first portion 12 between the inlet passageway 16 and outlet passageway 22 for directing fluid flow upwardly from inlet passageway 16 through an opening 28 into outlet passageway 22.

Figure 2:
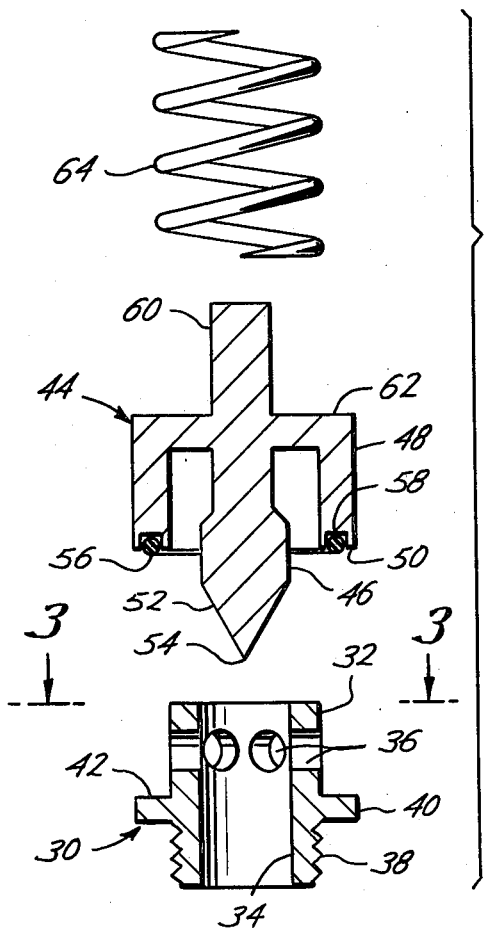
FIG. 2 is an exploded elevational view, partly in section, of a portion of the check valve illustrated in FIG. 1.
Figure 3:
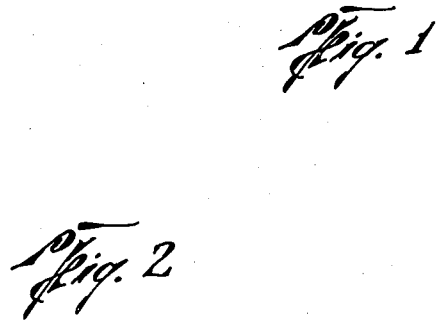
FIG. 3 is a plan view taken along lines 3—3 of the portion of the invention illustrated in FIG. 2.
Figure 3:
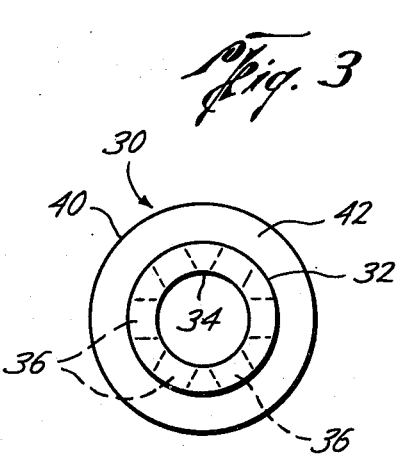

As best shown in FIGS. 2 and 3, valve body 10 also includes a second portion 30. Second portion 30 generally includes a tubular section 32, which defines a longitudinal passageway 34 and outlet ports 36 extending transversely therefrom. A threaded surface 38 is preferably located on the lower outside surface of tubular section 32 for threadably engaging in opening 28 to mount tubular section 30 to first portion 12. Fluid will, thus, be channeled by flow channeling shoulder 26 upwardly into the lower portion of longitudinal passage 34 for flowing up tubular section 32 and out outlet ports 36 into outlet passageway 22. A flange 40 extends outwardly from tubular sections 32 at a location below outlet ports 36 to define an upwardly facing sealing surface 42. The location of upwardly facing sealing surface 42 is disposed sufficiently below the outlet ports to inhibit possible erosion thereof by the flowing fluid.

A plunger member 44 is mounted within valve body 10 and includes a plug 46 mounted on the lower portion of plunger member 44 for sliding within longitudinal passageway 34 of second portion 30. A tubular sleeve 48 is mounted with plunger 44 and circumscribes tubular section 32. A shoulder is formed on sleeve 48 which defines a downwardly facing sealing surface 50 which is engageable with the upwardly facing sealing surface 42 of flange 40. Thus, when assembled sleeve 48 is moved upwardly by the fluid pressure exerted by the fluid flowing through inlet passageway 16 and up through longitudinal passageway 34. Preferably, plug 46 has a conically shaped lower end 42 with an apex 54 of cone 42 directed downwardly, the base of the cone being at an elevation which is lower than downwardly facing sealing surface 50 to thereby permit a gradual increase of fluid flow through the outlet ports 36 as plunger member 44 moves upwardly within valve body 11. Further, an O-ring 56 is preferably disposed within a channel 58 provided in sealing surface 50 so that improved sealing engagement is obtained between the upwardly and downwardly facing sealing surfaces. Also preferred, plunger member 44 has an upper portion 60 extending upwardly from plug 46 with a support member 62 extending transversely to upper portion 60 for mounting sleeve 48 mounted downwardly from support member 62.

A spring 64 is mounted within valve body 11 between a covering cap 66 and plunger member 44 for urging the downwardly facing sealing surface 50 into engagement with upwardly facing surface 42. Preferably, a downwardly directed sleeve 68 is provided with cap 66 to threadably mount the cap to the top of first portion 12 by forming threads 70 in the inner surface of sleeve 68 for engaging threads 72 in the outer surface of first portion 12. Spring 64 is preferably a coil spring mounted around upper portion 60 at plunger member 44 and is under compression obtained by compressing spring 64 when screwing cap 66 to first portion 12 which provides a downward force against support member 62. Thus, downwardly facing sealing surface 50 is urged into engagement with upwardly facing sealing surface 42 to thereby prevent fluid communication between inlet passageway 16 and outlet passageway 22 by stopping fluid flow into the outlet ports 36 when the pressure of the fluid within inlet passageway 16 is insufficient to overcome the force provided by spring 64.

Thus, it is apparent that there has been provided, in accordance with the invention, a check valve that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:
1. A check valve used in a fluid flow line, comprising:
A valve body, including
 (a) a first portion having
  (i) an inlet end for directing the flow of fluid from the flow line through an inlet passageway,
  (ii) an outlet end for directing the flow of fluid received from the inlet passageway through an outlet passageway into the fluid flow line,
  (iii) a flow channeling shoulder mounted at a junction between the inlet and outlet passageways for directing fluid flow upwardly from the inlet passageway through an opening into the outlet passage,
 (b) a second portion having
  (i) a tubular section defining a longitudinal passageway with outlet ports extending transversely therefrom, the tubular section being mounted in the opening of the first portion to receive the flowing fluid from the inlet passageway in one end of the longitudinal passageway for fluid flow up the tubular section and out the outlet ports into the outlet passageway,
  (ii) a flange extending outwardly from the tubular section at a location below the outlet ports to define an upwardly facing sealing surface, said upwardly facing sealing surface being disposed sufficiently below the outlet ports to inhibit erosion thereof by flowing fluid;
a plunger member mounted within said body, including
 (a) a plug mounted on a lower portion of said plunger member for sliding within the longitudinal passageway of the second portion of said body,
 (b) a tubular sleeve mounted with the plunger member and circumscribing the tubular section, said sleeve having a shoulder forming a downwardly facing sealing surface which is engageable with the upwardly facing sealing surface on the flange, the sleeve being moved upwardly by pressure from the fluid in the inlet passageway exerted on the plug; and
a spring mounted within said body urging the downwardly facing sealing surface of said plunger member into engagement with the upwardly facing sealing surface of said body to thereby prevent fluid communication between the inlet and outlet passageways by stopping fluid flow into the outlets ports when the pressure of the fluid within the inlet passageway is insufficient to overcome the force provided by the spring, wherein said plug has a conically shaped lower end with the apex of the cone directed downwardly and the base of the cone being at an elevation which is lower than the downwardly facing sealing surface of said plunger member.

2. The check valve of claim 1, including an O-ring seal disposed in a channel formed within the downwardly facing sealing surface of said plunger member for providing improved sealing engagement between the upwardly and downwardly facing sealing surfaces.

3. The check valve of claim 1, wherein said plunger member has an upper portion extending upwardly from the plug, a support member extending transversely to the upper portion of said plunger member, said sleeve being mounted downward from said support member; and said spring is a coil spring mounted around the upper portion and exerting a force against the support member.

4. The check valve of claim 1, wherein said plunger member has an upper portion extending upwardly from the plug, a support member extending transversely to the upper portion of said plunger member, said sleeve being mounted downward from said support members; and said spring being a coil spring mounted around the upper portion of said plunger member and exerting a force against the support member to thereby urge the downwardly facing sealing surface into engagement with the upwardly facing sealing surface; and including an O-ring seal disposed in a channel formed within the downwardly facing sealing surface of said plunger member for providing improved sealing engagement between the upwardly and downwardly facing sealing surfaces.

5. A check valve used in a fluid flow line, comprising:
A valve body, including
 (a) a first portion having
  (i) an inlet end for directing the flow of fluid from the flow line through an inlet passageway, (ii) an outlet end for directing the flow of fluid received from the inlet passageway through an outlet passageway into the fluid flow line, and (iii) a flow channeling shoulder mounted at a junction between the inlet and outlet passageways for directing fluid flow upwardly from the inlet passageway through an opening into the outlet passageway, (b) a second portion having (i) a tubular section defining a longitudinal passageway with outlet ports extending transversely therefrom, the tubular section being mounted in the opening of the first portion to receive the flowing fluid from the inlet passageway in one end of the longitudinal passageway for fluid flow up the tubular section and out the outlet ports into the outlet passageway, and (ii) a flange extending outwardly from the tubular section at a location below the outlet ports to define an upwardly facing sealing surface, said upwardly facing sealing surface being disposed sufficiently below the outlets ports to inhibit erosion thereof by flowing fluid;

(c) a plunger member having (i) a plug mounted on a lower portion thereof for sliding within the longitudinal passageway of the second body portion and guiding said plunger relative to said body second portion;

(ii) an upward portion extending axially from said plug;

(iii) an annular support member mounted with said upper portion; and (iv) a tubular sleeve mounted at the outer edge of said annular support member circumscribing the tubular section and having a shoulder forming a downwardly facing sealing surface engageable with the upwardly facing sealing surface of said tubular section flange, said downwardly facing sealing surface being at a higher elevation than the lower end of said plug;

(d) an O-ring seal mounted with at least one of said sealing surfaces for creating a positive seal therebetween; and (e) a spring mounted with said body for acting on the annular support member to urge the downwardly facing sealing surface into engagement with the upwardly facing sealing surface of said tubular portion flange, thereby inhibiting fluid communication between the inlet and outlet passageways when the pressure of fluid within the inlet passageway is insufficient to overcome the force provided by the spring.

* * * * *